US009696652B2

(12) United States Patent
Kim

(10) Patent No.: US 9,696,652 B2
(45) Date of Patent: Jul. 4, 2017

(54) DEVELOPING ROLLER FOR IMAGE FORMING APPARATUS

(71) Applicant: Samsung Electronics Co., Ltd., Suwon-si (KR)

(72) Inventor: Tae-hyun Kim, Hwaseong-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/955,499

(22) Filed: Dec. 1, 2015

(65) Prior Publication Data

US 2016/0187808 A1 Jun. 30, 2016

(30) Foreign Application Priority Data

Dec. 29, 2014 (KR) ........................ 10-2014-0192548

(51) Int. Cl.
*G03B 15/08* (2006.01)
*G03G 15/08* (2006.01)

(52) U.S. Cl.
CPC ..... *G03G 15/0808* (2013.01); *G03G 15/0818* (2013.01); *G03G 15/0822* (2013.01)

(58) Field of Classification Search
CPC ........... G03G 15/0818; G03G 15/0808; G03G 15/0877; G03G 21/18; G03G 9/0825; G02G 2215/0634; G02G 2215/0861
See application file for complete search history.

(56) References Cited

U.S. PATENT DOCUMENTS 5,475,473 A 12/1995 Masuda et al.
5,878,313 A 3/1999 Takagi et al.
5,881,344 A 3/1999 Kurokawa et al.
6,287,246 B1 9/2001 Yoshii et al.
6,475,584 B1 11/2002 Tsuchiya et al.
6,810,225 B2 10/2004 Kitano et al.
7,288,058 B2 10/2007 Kaji et al.
2005/0105939 A1* 5/2005 Ferrar ................ G03G 15/6573 399/322
2005/0153227 A1* 7/2005 Kurihara .............. G03G 7/0006 430/125.6
2007/0253720 A1* 11/2007 Kasai ................. G03G 15/0856 399/27
2008/0013985 A1* 1/2008 Yamakawa ........ G03G 15/0818 399/119
2008/0069599 A1* 3/2008 Nakamura ......... G03G 15/0808 399/281
2014/0072350 A1 3/2014 Urushihara et al.
2015/0014602 A1* 1/2015 Matsushita .......... G03G 15/162 252/511

* cited by examiner

*Primary Examiner* — Walter L Lindsay, Jr.
*Assistant Examiner* — Jessica L Eley
(74) *Attorney, Agent, or Firm* — Staas & Halsey LLP

(57) ABSTRACT

An electrophotographic image forming apparatus has a developing roller, wherein a glossiness of a surface of the developing roller is in a range of about 4 to about 15, the developing roller includes a plurality of protruding beads, a number average distance (Rsm) between the protruding beads is in a range of about 200 μm to about 400 μm, a supplying roller includes a plurality of foam cells, a number average size of the foam cells is in a range of about 300 μm to about 500 μm, and the developing roller is arranged to rotate at a rotation linear velocity that is about 120% to about 150% of a rotation linear velocity of a photoreceptor.

18 Claims, 1 Drawing Sheet

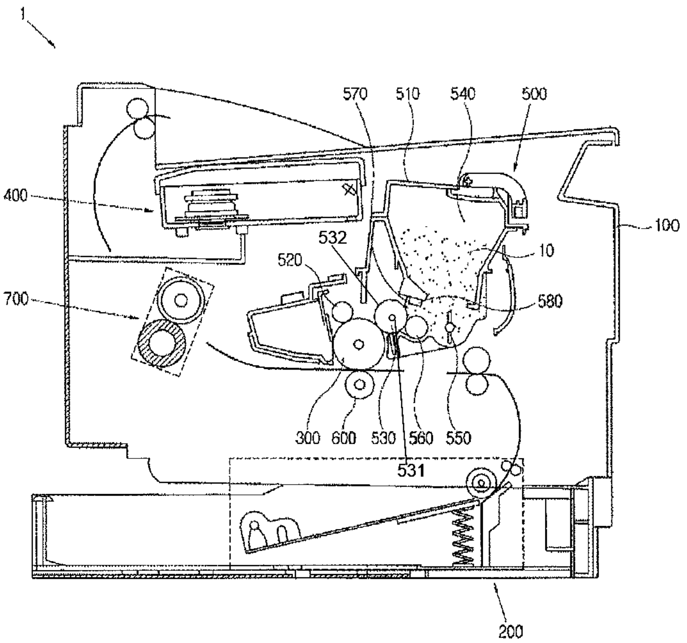
1
570
510
540
500
400
100
532
10
520
580
700
300
600
530
560
550
531
200

DEVELOPING ROLLER FOR IMAGE FORMING APPARATUS

CROSS-REFERENCE TO RELATED APPLICATIONS

This application claims the priority benefit of Korean Patent Application No. 10-2014-0192548, filed on Dec. 29, 2014, in the Korean Intellectual Property Office, the disclosure of which is incorporated herein in its entirety by reference.

BACKGROUND

1. Field

Embodiments relate to an electrophotographic image forming apparatus and an imaging cartridge.

2. Description of the Related Art

An electrophotographic image forming apparatus, which is applied to image forming apparatuses, such as a laser copy machine or a laser printer forms an image on a recording medium by forming a toner image on a photosensitive drum through the charging, light-exposure, and development processes, electrostastically transferring the formed toner image to the recording medium, and, lastly, fixing the transferred toner image to the recording medium.

In recent years, a demand for an electrophotographic image forming apparatus that forms an image of further high quality and has a further long lifespan has rapidly increased. For example, a high quality image may be formed by reducing a particle size of the toner (e.g., about 7 μm or less). In order to form a high glossy image, for example, a glass transition temperature (Tg) of the toner may be lowered. In the case of a polymerized toner, a lower Tg (e.g., about 58° C. or lower) is needed to facilitate low-temperature fixing and to obtain a high glossy image. Accordingly, a durability of the polymerized toner is weakening. Therefore, it is even more difficult to increase a lifespan of an image forming apparatus using a polymerized toner than it is difficult to increase a lifespan of an image forming apparatus using a pulverized toner. Thus, various technical problems need to be resolved to increase a lifespan of an image forming apparatus using a polymerized toner, and this includes preventing filming of a developing roller.

In the electrophotographic image forming apparatus, a supplying roller transfers toner from a toner reservoir to a developing roller. The developing roller transfers the toner to a photoreceptor drum. Also, the supplying roller also resets the developing roller by removing the remaining toner on the developing roller. In a conventional art, for example, a nip between the developing roller and the supplying roller is increased so as to prevent filming of the developing roller. For example, in a conventional art, resetting performance of the developing roller is enhanced by increasing hardness of foam of the supplying roller so as to prevent filming of the developing roller. Also, for example, in a conventional art, fouling resistance of the developing roller is enhanced by coating a surface of the developing roller with a coating solution including a resin having a low surface energy such as a fluorine resin so as to prevent filming of the developing roller, and thus a resetting performance of the developing roller is improved.

However, when the nip between the developing roller and the supplying roller is increased or hardness of the foam of the supplying roller is increased, a resetting performance of the developing roller improves, but stress applied to the toner increases. When the stress applied to the toner increases, for example, quality of the image may decrease as vertical white lines and high-tone dirty spots may be generated. When a surface of the developing roller is coated with a coating solution containing a resin having a low surface energy, such as a fluorine resin, a manufacturing cost may increase due to high expense of the fluorine resin. In addition, when a surface of the developing roller is coated with a coating solution containing a resin having a low surface energy, such as a fluorine resin, the use of a negatively chargeable toner may cause a reverse polarity toner, and thus problems such as background contamination may occur. Also, it is commonly known that filming of the developing roller is not significantly reduced even when a surface of the developing roller is coated with a coating layer including a resin having a low surface energy such as a fluorine resin.

SUMMARY

In an aspect of one or more embodiments, there is provided an electrophotographic image forming apparatus and an imaging cartridge that may significantly reduce a filming phenomenon of a developing roller by significantly improving a resetting performance of the developing roller.

According to an aspect of an exemplary embodiment, an electrophotographic image forming apparatus includes a main body; a toner reserving unit; a photoreceptor configured to form an electrostatic latent image; a developing roller that develops the electrostatic latent image by supplying a toner to the electrostatic latent image; and a supplying roller that supplies the toner from the toner reserving unit to the developing roller, wherein a glossiness on a surface of the developing roller is in a range of about 4 to about 15, the surface of the developing roller includes a plurality of protruding beads, and a number average distance (Rsm) between the protruding beads is in a range of about 200 μm to about 400 μm, the supplying roller includes a plurality of foam cells, and a number average size of the foam cells is in a range of about 300 μm to about 500 μm, and the developing roller is arranged to rotate at a rotation linear velocity of about 120% to about 150% of a rotation linear velocity of the photoreceptor.

According to an aspect of the present disclosure, one or more embodiments of the image forming apparatus may effectively achieve all of improving image optical density, improving toner supplying performance, preventing filming of a developing roller, preventing vertical white lines, and preventing side contamination at the same time by limiting a surface glossiness of a developing roller, a number average distance (Rsm) of protruding beads of the developing roller, a number average size of foam cells of a supplying roller, and a rotation linear velocity of the developing roller as described above. This is because the image forming apparatus has an improved performance of resetting the developing roller. Thereby, the image forming apparatus may print higher quality images for a longer period of time.

The developing roller resetting performance of the image forming apparatus derives from the supplying roller containing a plurality of the foam cells. Opened cells and exposed cross-sections of cell walls are arranged on a surface of the supplying roller containing a plurality of the foam cells. Due to the opened cells and exposed cross-sections of cell walls, the supplying roller that rotates in contact with the developing roller not only supplies a toner to the developing roller but may also remove the remaining toner from the developing roller. The remaining toner of the developing roller refers to the toner that is not transferred to a photoreceptor but remained on the developing roller. Resetting the developing roller denotes removing the remaining toner from the developing roller. When the remaining toner is accumulated on the developing roller, an image of poor quality begins to be printed within a shorter period of operating time, and thus lifespan of the image forming apparatus may rapidly decrease. On the other hand, when the remaining toner is effectively removed from the developing roller, the printing of an image with deteriorated quality may not occur even after a longer-term use, and thus lifespan of the image forming apparatus may significantly increase.

It is notable that the supplying roller may effectively remove the remaining toner of the developing roller while maintaining an improved quality of the printed image, by limiting a surface glossiness of the developing roller, a number average distance (Rsm) between the protruding beads of the developing roller, a number average size of the foam cells of the supplying roller, and a rotation linear velocity of the developing roller as described above. In this regard, the image forming apparatus according to one of more embodiments may have a significantly improved performance of resetting the developing roller.

BRIEF DESCRIPTION OF THE DRAWINGS

These and/or other aspects will become apparent and more readily appreciated from the following description of exemplary embodiments, taken in conjunction with the accompanying drawings in which:

FIG. 1 is a schematic cross-sectional view of an image forming apparatus according to an exemplary embodiment.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects. As used herein, the term “and/or” includes any and all combinations of one or more of the associated listed items. Expressions such as “at least one of,” when preceding a list of elements, modify the entire list of elements and do not modify the individual elements of the list.

Hereinafter, referring to FIG. 1, an image forming apparatus according to an exemplary embodiment will be described in detail. FIG. 1 is a cross-sectional view schematically illustrating the image forming apparatus according to an aspect of an exemplary embodiment.

The image forming apparatus 1 of FIG. 1 includes a photoreceptor 300 in the form of a photoreceptor drum; a charging member 520 in the form of a charging roller; an electrostatic latent image forming member 400 in the form of a light scanning unit; a toner receiving unit 540 of a developer 510; a developing roller 530; a supplying roller 560; and a transferring member 600 in the form of a transferring roller. The charging member 520 charges a surface of the photoreceptor 300. The electrostatic latent image forming member 400 forms an electrostatic latent image on the surface of the photoreceptor 300. The toner receiving unit 540 reserves a toner 10. The toner receiving unit 540 includes an agitator 550. The developing roller 530 supplies the toner 10 to the photoreceptor 300 so that an electrostatic latent image may be developed into a toner image. The supplying roller 560 rotates in contact with the developing roller 530. Also, the supplying roller 560 supplies the toner 10 of the toner receiving unit 540 to the developing roller 530. The transferring member 600 transfers the toner image to a recording medium. In some embodiments, the image forming apparatus 1 of FIG. 1 may further include a main body casing 100, a recording medium supplying unit 200, a regulating blade 570, a toner charging member 580, and a fixing unit 700. The recording media are loaded up in the recording medium supplying unit 200. The regulating blade 570 contacts the developing roller 530 under pressure. The regulating blade 570 secures the uniformity of the amount of a toner that is supplied by the supplying roller 560 and attached to the developing roller 530. The regulating blade 570 may charge the toner attached to the developing roller 530 to allow the toner to have a potential value. The toner charging member 580 charges the toner 10 while being in contact with the toner 10. The fixing unit 700 fixes the toner image transferred to the recording medium to the recording medium.

As shown in FIG. 1, the photoreceptor 300, the developing roller 530, and the supplying roller 560 may be configured in the form of an imaging cartridge 500. In this case, the imaging cartridge 500 including the photoreceptor 300, the developing roller 530, and the supplying roller 560 may be detachably mounted on the image forming apparatus 1.

A surface glossiness of the developing roller 530 may be in a range of about 4 to about 15. When the surface glossiness of the developing roller 530 is lower than about 4, a resetting performance of the developing roller 530 may deteriorate. Also, when the surface glossiness of the developing roller 530 is higher than about 15, a thickness of a toner layer developed on an electrostatic latent image decreases, and thus the optical density of the image may deteriorate.

A surface of the developing roller 530 includes a plurality of protruding beads, and a number average distance (Rsm) between the protruding beads may be in a range of about 200 μm to about 400 μm. When the number average distance (Rsm) between the protruding beads is less than about 200 μm, a resetting performance of the developing roller 530 may deteriorate. When the number average distance (Rsm) between the protruding beads is greater than about 400 μm, a thickness of a toner layer which is developed on an electrostatic latent image decreases, and thus, the optical density of the image may deteriorate.

For example, the developing roller 530 may include a shaft 531; an electroconductive elastic layer provided on an outer circumference of the shaft 531; and a surface layer 532 that covers the electroconductive elastic layer, wherein the surface layer 532 may include a plurality of protruding beads, a glossiness of the surface layer 532 is in a range of about 4 to about 15, and a number average distance (Rsm) between the protruding beads is in a range of about 200μm to about 400 μm.

The shaft 531 has an electric conductivity. For example, the shaft 531 may have a shape of a cylinder. For example, the shaft 531 may be formed of a metal such as aluminum, iron, or stainless steel. For example, an external diameter of the shaft may be in a range of about 4 mm to about 14 mm.

For example, the electroconductive elastic layer may include an elastomer matrix; and electroconductive particles dispersed in the elastomer matrix. For example, the elastomer matrix may include natural rubber, polyurethane, butyl rubber, nitrile rubber, polyisoprene rubber, polybutadiene rubber, silicone rubber, styrene-butadiene rubber, ethylene-propylene rubber, ethylene-propylene-diene rubber, chloroprene rubber, acrylic rubber, a mixture thereof, or a foam thereof. In particular, the elastomer matrix may be silicone rubber, ethylene-propylene-diene rubber, polyurethane, a mixture thereof, or a foam thereof. When silicone rubber, polyurethane, or ethylene-propylene-diene rubber is used as the elastomer matrix, a developing roller may have a low hardness and an improved abrasion resistance. In this regard, the problem of deterioration of image quality caused by deterioration of abrasion resistance due to long-term use or the problem of toner leakage caused by abrasion of a toner sealing member at each end of the developing roller may be prevented. Examples of the silicone rubber may include methylphenyl silicone rubber, fluoro-modified silicone rubber, polyether-modified silicone rubber, and alcohol-modified silicone rubber. Examples of the electroconductive particles may include carbon black such as KETJEN BLACK EC and acetylene black; carbon black for rubber such as Super Abrasion Furnace (SAF) Intermediate Super Abrasion Furnace (ISAF), High Abrasion Furnace (HAF), Extra Conductive Furnace (XCF), Fast Extruding Furnace (FEF), General Purpose Furnace (GPF), Semi Reinforcing Furnace (SRF), Fine Thermal (FT) and Medium Thermal (MT); oxidation-treated carbon black for color ink; metal particles of copper, silver, or germanium; and metal oxide particles. These may be used as a single material or as a combination of at least two selected therefrom. Particularly, a carbon black that may easily control a conductivity of the electroconductive elastic layer with a small amount may be used. For example, an amount of the electroconductive particles may be in a range of about 0.5 part to about 50 parts by weight based on 100 parts by weight of the elastomer matrix. In some embodiments, an amount of the electroconductive particles may be in a range of about 1 part to about 30 parts by weight based on 100 parts by weight of the elastomer matrix.

The electroconductive elastic layer may include, for example, an elastomer matrix; and an ion conductive material contained in the elastomer matrix. Examples of the ion conductive material may include an inorganic ion conductive material such as sodium perchlorate, lithium perchlorate, calcium perchlorate, or lithium chloride; an organic ion conductive material such as modified aliphatic dimethylaluminum isosulfate or stearylammonium acetate; or a mixture thereof. For example, an amount of the ion conductive material may be in a range of about 0.5 part to about 50 parts by weight based on 100 parts by weight of the elastomer matrix. In some embodiments, an amount of the ion conductive material may be in a range of about 1 part to about 30 parts by weight based on 100 parts by weight of the elastomer matrix.

For example, a specific resistance of the electroconductive elastic layer may be in a range of about $10^2$ Ωcm to about $10^{10}$ Ωcm. In some embodiments, a specific resistance of the electroconductive elastic layer may be in a range of about $10^3$ Ωcm to about $10^6$ Ωcm. For example, a hardness (ASKER-C) of the electroconductive elastic layer may be in a range of about 25° to about 70°. For example, a thickness of the electroconductive elastic layer may be in a range of about 0.5 mm to about 8.0 mm. When the thickness of the electroconductive elastic layer is within this range, the developing roller may have an excellent elasticity, recovery from deformation of a roller base material may be secured, and a stress applied to a toner may decrease.

For example, the surface layer 532 may include a polymer matrix; and electroconductive particles dispersed in the polymer matrix. For example, the polymer matrix may include polyamide resin, urethane resin, urea resin, imide resin, melamine resin, fluororesin, phenol resin, alkyd resin, silicon resin, polyester resin, polyether resin, and a mixture thereof. These may be used as a single resin or as a combination of at least two selected therefrom. Examples of the electroconductive particles may include carbon black such as KETJEN BLACK EC and acetylene black; carbon black for rubber such as Super Abrasion Furnace (SAF), Intermediate Super Abrasion Furnace (ISAF), High Abrasion Furnace (HAF), Extra Conductive Furnace (XCF), Fast Extruding Furnace (FEF), General Purpose Furnace (GPF), Semi Reinforcing Furnace (SRF), Fine Thermal (FT) and Medium Thermal (MT); oxidation-treated carbon black for color ink; metal particles of copper, silver, or germanium; and metal oxide particles. These may be used as a single material or as a combination of at least two selected therefrom. Particularly, a carbon black that may easily control a conductivity of the surface layer 532 with a small amount may be used. For example, an amount of the electroconductive particles may be in a range of about 1 part to about 50 parts by weight based on 100 parts by weight of the polymer matrix.

In some embodiments, the surface layer 532 may include a polymer matrix; and an ion conductive material contained in the polymer matrix. Examples of the ion conductive material may include an inorganic ion conductive material such as sodium perchlorate, lithium perchlorate, calcium perchlorate, or lithium chloride; an organic ion conductive material such as modified aliphatic dimethylaluminum isosulfate or stearylammonium acetate; or a mixture thereof. For example, an amount of the ion conductive material may be in a range of about 1 part to about 50 parts by weight based on 100 parts by weight of the polymer matrix.

In some embodiments, the polymer matrix of the surface layer 532 may include urethane resin. Urethane resin is a polymer having a urethane bond. For example, urethane resin may include an isocyanate moiety including an isocyanate group and a polyol moiety including a hydroxyl group. Examples of the isocyanate moiety may include trilene diisocyanate (TDI), 4,4'-methylene diphenyl diisocyanate (MDI), polymeric MDI, modified MDI, naphthalene 1,5-diisocyanate, trizine diisocyanate, hexamethylene diisocyanate, isophorone diisocyanate, p-phenylene diisocyanate, trans-cyclohexane-1,4-diisocyanate, xylene diisocyanate (XDI), hydrogenated XDI, hydrogenated MDI, lysine diisocyanate, triphenylmethane triisocyanate, tris(isocyanate phenyl)thiophosphate, tetramethyl xylene diisocyanate, lysine ester triisocyanate, 1,6,11-undecane triisocyanate, 1,8-diisocyanate-4-isocyanatemethyl octane, 1,3,6-hexamethylene triisocyanate, bicyclo heptane triisocyanate, trimethylhexamethylene diisocyanate, block-type isocyanate (having a structure in which isocyanate is masked with a blocking agent), or a combination thereof. The block-type isocyanate does not react at room temperature, but when heated to a temperature at which the blocking agent dissociates, an isocyanate group may be re-produced in the block-type isocyanate. These may be used as a single material or as a combination of at least two selected therefrom. Examples of the polyol moiety may include polyoxypropylene glycol, polytetramethylene ether glycol, THF-alkylene oxide copolymer polyol, polyester polyol, acrylic polyol, polyolefin polyol, a partially hydrolysate product of a ethylene-vinyl acetate copolymer, phosphate-based polyol, halogen-containing polyol, adipate-based polyol, polycarbonate polyol, polycaprolactone-based polyol, polybutadiene polyol, or a combination of at least two selected therefrom. The urethane resin material may further include a catalyst if necessary. Examples of the catalyst may include triethylamine, N,N,N',N'-tetramethyl-ethylenediamine, N,N,N',N'',N''-pentamethyldiethylenetriamine, triethylenediamine, dimethylaminoethanol, bis(2-methylaminoethyl) ether, or a combination of at least two selected therefrom. An amount of the catalyst may be, for example, in a range of about 0.05 part to about 5 parts by weight based on 100 parts by weight of the total of polyol components and isocyanate components. The urethane resin material may further include an additional resin and a functional additive. Examples of the additional resin may include styrene resin, acryl resin, vinyl chloride resin, styrene-vinyl acetate copolymer, modified maleic acid resin, phenol resin, epoxy resin, polyester resin, fluorine resin, low-molecular weight polyethylene, low-molecular weight polypropylene, ionomer resin, polyurethane resin, nylon resin, silicon resin, keton resin, ethylene-ethylacrylate copolymer, xylene resin, polyvinylbutylal resin, or a combination of at least two selected therefrom. Particularly, urethane resin, nylon resin, acryl resin, or fluorine resin may be used as they have excellent abrasion resistance, toner charging property, and toner transporting property. The functional additive may be, for example, a conductive agent such as carbon black or metal oxide; a stabilizing agent; or a combination thereof.

The surface layer 532 further includes beads. Accordingly, the surface layer 532 may have protruding beads. Also, the beads allows the surface layer 532 to have an appropriate mechanical strength and controls a surface roughness (and a glossiness of a surface of a developing roller, accordingly).

Examples of the beads may include acryl-based resin such as polyacrylate or polymethacrylate; polyamide-based resin such as nylon; polyolefin-based resin such as polyethylene or polypropylene; silicon-based resin; phenol-based resin; polyurethane-based resin; styrene-based resin; benzoguanamine resin; polyvinylidene fluoride-based resin; a metal oxide powder such as silica, alumina, a titanium oxide, and an iron oxide; boron nitride; silicon carbide; or a combination of at least two selected therefrom. When a polymer resin is used, the polymer resin may be cross-linked. A shape of the beads is not particularly limited, and a shape of the beads may be, for example, sphere, plate, or irregular.

A surface roughness (and a glossiness of a surface of a developing roller, accordingly) of the surface layer 532 may be controlled by changing a particle size of the beads, an amount of the included beads, and a thickness of the surface layer 532. For example, a thickness of the surface layer 532 may be in a range of about 1 μm to about 100 μm, or, for example, about 3 μm to about 30 μm. For example, a specific resistance of the surface layer 532 may be in a range of about $10^5$ Ωcm to about $10^{11}$ Ωcm, or, for example, about $10^7$ Ωcm to about $10^{10}$ Ωcm.

The supplying roller 560 includes a plurality of foam cells, and a number average size of the foam cells may be in a range of about 300 μm to about 500 μm. When the number average size of the foam cells is less than about 300 μm, a toner supplying performance of the supplying roller 560 may deteriorate. When the number average size of the foam cells is greater than about 500 μm, a performance of resetting the developing roller 530 may deteriorate.

For example, the supplying roller 560 may include a resin foam; and a conductive agent included in the resin foam. For example, the resin foam may be polyurethane foam, ethylene-propylene-diene rubber foam, or silicon rubber foam. The supplying roller 560 may have a low resistance value, for example, in a range of about $1.0\times10^3$ to about $9.0\times10^7$ Ωcm. The resin foam may be prepared, for example, via an internal addition process, in which the foam is foamed in-situ in the presence of a conductive agent (for example, carbon black) in the resin, or via an external addition process, in which conductivity of the resin foam is implemented by impregnating the foam with an impregnation solution including carbon black, a solvent, and a binder resin.

The polyurethane foam is prepared by: adding additives such as a catalyst, a surfactant, a foaming agent, and a reactive conductive agent to a mixture of a compound having at least two active hydrogens and a compound having at least two isocyanate groups; stirring and mixing the mixture; and, foaming and hardening the mixture. The compound having at least two active hydrogens may be polyol that is generally used as a raw material of polyurethane foam, and examples of the polyol may include polyether polyol, polyester polyol, or polyetherester polyol which have a hydroxyl group at its end. Also, examples of the polyol may include modified polyol such as acryl modified polyol or silicon modified polyol. The compound having at least two isocyanate groups may be polyisocyanate that is also generally used as a raw material of polyurethane foam, and examples of the polyisocyanate may include trilene diisocyanate (TDI), 4,4'-methylene diphenyl diisocyanate (MDI), and a mixture or a derivative thereof. Selection of types and control of a usage amount of the catalyst for preparing urethane foam are important to improve foaming characteristics, reaction time, and air permeability of the foam and to reduce density deviation of the foam. Examples of the catalyst may include a tin-based, lead-based, iron-based, or titanium-based organic metal compound or an amine-based compound, and these may be used as a combination. Particularly, a tertiary amine or a tin-based catalyst may be used as the catalyst. The foaming agent may be a low-boiling point material such as water or a halogenated alkane, for example, trichlorofluoromethane. The surfactant is used to reduce the surface tension to improve the miscibility, to generate bubbles of uniform size, and to control a cell structure of the foam, and thus, allowing the resultant foam to be stable. An example of the surfactant may be a silicon surfactant. An amount of the surfactant may be in a range of about 0.1 prh to about 5 prh based on the total amount of the polyol. When the amount of the surfactant is less than 0.1 phr, the surfactant is not effective, and when the amount of the surfactant is greater than 5 phr, properties of the foam such as a permanent compression decrease rate may degrade. The impregnation solution may be prepared by adding an electroconductive agent and a binder resin to a solvent such as water, alcohol, or ether. The binder resin for the impregnation solution may be nylon or PMMA resin having a charge that is more positive (+) than that of urethane. The binder resin may be used as a single material or a mixture of at least two selected from the examples above. An amount of the binder resin may be in a range of about 5 phr to about 50 phr. When the amount of the binder resin is less than 5 phr, an electroconductive agent may be detached from a cell wall of the urethane foam due to a weak adhesion strength, and when the amount of the binder resin is greater than 50 phr, a recovering property of the urethane foam may deteriorate. The electroconductive agent may be conductive carbon such as ketjen black EC, acetylene black, carbon for use with rubber, ink carbon subjected to oxidation treatment, or thermally decomposed carbon. In particular, the electroconductive agent may be carbon for use with rubber such as Super Abrasion Furnace (SAF), Intermediate Super Abrasion Furnace (ISAF), High Abrasion Furnace (HAF), Extra Conductive Furnace (XCF), Fast Extruding Furnace (FEF), General Purpose Furnace (GPF), Semi Reinforcing Furnace (SRF), Fine Thermal (FT), or Medium Thermal (MT). Also, the electroconductive agent may be graphite such as natural graphite or artificial graphite. The electroconductive agent may be a metal oxide such as a tin oxide, a titanium oxide, or a zinc oxide; or metal such as nickel, copper, silver, or germanium. The electroconductive agent may be conductive carbon black. Conductive carbon black may have a small average particle diameter and a large surface area. Examples of the conductive carbon black may include ketjen black EC, ketjen black 300J, ketjen black 600J, Vulcan XC, Vulcan CSX, an acetylene black such as Denka black, and conductive furnace black. An amount of the conductive carbon black may be in a range of about 3 phr to about 30 phr. When the amount of the conductive carbon black is less than about 3 phr, the desired conductivity may not be obtained, and when the amount of the conductive carbon black is greater than about 30 phr, too much carbon black is attached on the urethane foam, and thus the carbon black may be detached from the foam, or a mechanical property such as elasticity of the foam may deteriorate.

The developing roller 530 is arranged to rotate at a rotation linear velocity of about 120% to about 150% of a rotation linear velocity of the photoreceptor 300. When the rotation linear velocity of the developing roller 530 is less than about 120% of the a rotation linear velocity of the photoreceptor 300, a toner supplying performance of the developing roller 530 may deteriorate, and thus an image concentration may be reduced. When the rotation linear velocity of the developing roller 530 is greater than about 150% of the rotation linear velocity of the photoreceptor 300, a stress applied to the toner increases, which may result in vertical white-lines and image contamination.

Embodiments of the image forming apparatus may be particularly applied to an electrophotographic image forming apparatus that uses a polymerized toner, or, more particularly, to an electrophotographic image forming apparatus that uses a dry toner (e.g., a styrene-acrylate-based toner or a polyester-based toner) having a sphericity in a range of about 0.960 to about 1.0.

According to another aspect of an exemplary embodiment, provided is an imaging cartridge. The imaging cartridge is attachable and detachable to a main body of an electrophotographic image forming apparatus including a toner receiving unit. The imaging cartridge includes a photoreceptor, on which an electrostatic latent image is formed; a developing roller that develops the electrostatic latent image by supplying a toner to the electrostatic latent image; and a supplying roller that supplies the toner from the toner receiving unit to the developing roller, wherein a glossiness of a surface of the developing roller is in a range of about 4 to about 15, the surface of the developing roller includes a plurality of protruding beads, a number average distance (Rsm) between the protruding beads is in a range of about 200 μm to about 400 μm, the supplying roller includes a plurality of foam cells, a number average size of the foam cells is in a range of about 300 μm to about 500 μm, and the developing roller is arranged to rotate at a rotation linear velocity of about 120% to about 150% of a rotation linear velocity of the photoreceptor.

EXAMPLE

Example 1

(1) Preparation of Developing Roller

Shaft

A hallow cylinder-type conductive shaft of SUS303 having a diameter of 8 mm was prepared as a shaft of a developing roller.

Electroconductive Elastic Layer

First, a solution was prepared by dissolving 100 parts by weight of urethane resin "Niporan 5199" (available from Nippon Urethane Co., Ltd.), which is a thermoplastic elastomer, to 500 parts by weight of methylethyl ketone. Then, 20 parts by weight of carbon black "Ketjen black EC300J" (available from Lion Corporation) and 0.001 part by weight of trimethyl octadecyl ammonium perchlorate were dispersed in the solution by using a sand mill for 2 hours to prepare a coating solution for forming an electroconductive elastic layer.

Next, the coating solution for forming an electroconductive elastic layer was sprayed on an outer surface of the shaft and dried at 120° C. for 1 hours to form an electroconductive elastic layer having a thickness of 10 μm.

Surface Layer

A solution was prepared by dissolving 100 parts by weight of urethane resin "Niporan 5199" (available from Nippon Urethane Co., Ltd.), which is a thermoplastic elastomer, to 500 parts by weight of methylethyl ketone. Then, 20 parts by weight of carbon black "Ketjen black EC300J" (available from Lion Corporation), 0.001 part by weight of trimethyl octadecyl ammonium perchlorate, and polyurethane beads (SP-006 (6 μm) and SP-010 (10 μm) (available from Negatmi Chemial Industrial Co., Ltd., Japan) were dispersed in the solution by using a sand mill for 2 hours to prepare a coating solution for forming a surface layer.

Next, the coating solution for forming a surface layer was sprayed on an outer surface of the electroconductive elastic layer, and dried at 120° C. to 150 ° C. for 1 hours to form a surface layer having a thickness of 10 μm.

(2) Preparation of Supplying Roller

A premixed polyol was prepared by adding 4 phr of water as a foaming agent, 1.5 phr of silicone as a surfactant, 0.2 phr of triethylenediamine (TEDA) as a catalyst, and 5 phr of a lithium complex as an ion conductive agent, to a polyol including a mixture of 80 phr of polyester polyol (Korea Polyol Company Limited., GP-3000, hydroxyl value of 54 mg KOH/g), and 20 phr of acryl polyol (Korea Polyol Company Limited, KE-848, hydroxyl value of 30 mg KOH/g). 105 phr of toluene diisocyanate (TDI) was added and the components were mixed and agitated at 2000 rpm. A semiconductive slab foam was prepared at room temperature. (KE-848 is an AN copolymer polyol, and includes 20% of AN(acrylonitrile)).

The slab foam was put into a chamber and nitrogen and hydrogen were added to provide a filter foam having 80% or more open cell content.

An impregnating solution was prepared by adding 5 phr of nylon resin (Hyosung, 1101 BRT) and 5 phr of lauryl trimethyl ammonium salt (Nano Chem Tech) to 100 phr of ethanol solvent. The filter foam was immersed in the impregnating solution, and put in the roller for squeezing. The impregnated filter foam was put into a convection oven for 10 minutes at 130° C., the solvent was removed, and the dried polyurethane foam was prepared.

The dried polyurethane foam was cut by a vertical cutter to 25×25×250 mm dimensions, and a 5.0 mm hole was bored through the central portion in a length-wise direction, and a metal shaft, which is 6.0 mm in diameter and wrapped by a hot melt sheet, was press-fit into the hole. The polyurethane foam was heated for 30 minutes at 120° C. in a convection oven so that the foam and the shaft were bonded to each other.

Next, the bonded polyurethane foam was ground by a grinder. By cutting both ends of the foam, a polyurethane foam toner supply roller, which was 13.7 mm in outer diameter and 220 mm in length, was obtained.

(3) Preparation of Developing Cartridge and Image Forming Apparatus

A conventional developing roller and a conventional supplying roller of a developing cartridge M4580 (Samsung Electronics) were replaced with the developing roller and the supplying roller prepared as described above. Also, rotation rates of gears in the developing cartridge M4580 were changed so that a linear velocity of the developing roller was about 120% with respect to a linear velocity of a photoreceptor. The modified M4580 was mounted in a laser printer C4010 (Samsung Electronics), and thus an image forming apparatus of Example 1 was prepared.

Examples 2 to 6 and Comparative Examples 1 to 10

A surface glossiness of the developing roller may be controlled by an amount of the beads. When the amount of the beads is high, the surface glossiness of the developing roller decreases, and when the amount of the beads is low, the surface glossiness of the developing roller increases. Rsm of the developing roller may be controlled by controlling an amount and a size of the beads. When the amount of the beads is high, the Rsm decreases, and when the amount of the beads is low, the Rsm increases. When the amount of the beads is the same, the Rsm decreases when a size of the beads is large. A size of a foam cell of the supplying roller may be controlled by an amount of the foaming agent. When the amount of the foaming agent is high, a size of the foam cell increases. The beads used for the developing roller were polyurethane beads (SP-006 (6 μm) and SP-010 (10 μm) (available from Negatmi Chemial Industrial Co., Ltd., Japan). The foaming agent used for the supplying roller was water ($H_2O$). An amount of the beads was in a PHR unit based on 100 parts by weight of polyol. An amount of the foaming agent (water) was in a PHR unit based on 100 parts by weight of polyol. Image forming apparatuses of Examples 2 to 6 and Comparative Examples 1 to 10 were prepared in the same manner as in Example 1, except that an amount and a size of the polyurethane beads were changed in the preparation of the developing roller, and that an amount of the foaming agent (water) was changed in the preparation of the supplying roller.

The usage amounts of the polyurethane beads, sizes of the polyurethane beads, and the foaming agent (water) used in Examples 1 to 6 and Comparative Examples 1 to 10 are shown in Table 1.

TABLE 1

| | (unit: phr) | | |
|---|---|---|---|
| | Developing roller, Polyurethane beads, 6 μm | Developing roller, Polyurethane beads, 10 μm | Supplying roller, Foaming agent (water) |
| Example 1 | 30 | — | 2.0 |
| Example 2 | 20 | — | 1.5 |
| Example 3 | 20 | — | 2.5 |
| Example 4 | 40 | — | 1.5 |
| Example 5 | 40 | — | 2.5 |
| Example 6 | 40 | — | 2.5 |
| Comparative Example 1 | 45 | — | 2.5 |
| Comparative Example 2 | 40 | — | 1.0 |
| Comparative Example 3 | — | 20 | 2.5 |
| Comparative Example 4 | — | 20 | 1.0 |
| Comparative Example 5 | — | 40 | 1.0 |
| Comparative Example 6 | — | 40 | 3.0 |
| Comparative Example 7 | 40 | — | 2.5 |
| Comparative Example 8 | 40 | — | 2.5 |
| Comparative Example 9 | 20 | — | 1.5 |
| Comparative Example 10 | 20 | — | 1.5 |

<Evaluation>

Image Concentration

A average value of optical densities from patches at 5 predetermined locations of a printed image was calculated. A spectrophotometer was "SpectroEye" (X-Rite, USA). Evaluation standards with respect to black toner were as follows:

◎: Optical density of 1.38 or higher

○: Optical density of 1.28 or higher to lower than 1.38

Δ: Optical density of 1.08 or higher to lower than 1.28

×: Optical density of lower than 1.08

Toner Supplying Performance

A rear end toner supplying defect was measured while printing a solid image. Optical densities from patches at 5 predetermined locations of the printed image were measured by using a spectrophotometer, "SpectroEye" (X-Rite, USA). Then, a difference between the highest optical density and the lowest optical density was calculated. Evaluation standards with respect to a toner supplying performance were as follows:

◎: Optical density difference of 0.1 or less

○: Optical density difference of greater than 0.1 to 0.15 or less

Δ: Optical density difference of greater than 0.15 to 0.20 or less

×: Optical density difference of greater than 0.20

Developing Roller Filming

After printing every 100K sheets, an amount of the remaining toner accumulated on a surface of the developing roller was taped by using 3M tape. Then, optical densities from patches at 3 predetermined locations of the developing roller were measured, and their average value was calculated. The optical densities were measured by using a spectrophotometer, "SpectroEye" (X-Rite, USA).

◎: Optical density of lower than 0.03

○: Optical density of 0.03 or higher to lower than 0.05

Δ: Optical density of 0.05 or higher to lower than 0.07

×: Optical density of 0.07 or higher

Side Contamination

When a poor reset is generated in the developing roller, a thickness of a toner layer may increase, filming of the developing roller may be enhanced, and thus the toner layer may not be easily controlled. Thus, the toner layer at both side ends of the image may become too high, and thus background contamination caused by concentration gradient may occur. The side contamination was evaluated with bare eyes by observing background contamination generated on a non-image region that is located at about 3 mm to about 9 mm from left and right ends of the paper after printing 100K sheets.

⊚: No side contamination

○: A little side contamination

Δ: Much side contamination

×: Severe side contamination

Vertical White Lines

Vertical white line is a phenomenon, in which a plurality of sharp and thin vertical lines appear on the printed image. When a stress is applied to a toner, the toner is deteriorated, and the deteriorated toner sticks to a doctor blade, which results in the vertical white lines on the image. After printing 100K sheets, the degree of vertical white line occurrence was observed with bare eyes. The degree of vertical white line occurrence was classified into 4 different levels.

⊚: No vertical white line

○: A little vertical white lines

Δ: Many vertical white lines

×: Severe vertical white lines

Glossiness Measurement

Glossiness is measured by an intensity of a reflecting light that is obtained at a reflection angle, which is the same angle with an incident angle of incident light by using a specular reflection glossmeter. The glossiness is a relative ratio with respect to 100 of a glossiness of a surface of glass having a refractive index of 1.567. In the glossiness measurement, the incident angle of incident light was 60 degree. The glossiness was performed at a standard condition (25° C. and 1 atm). The glossiness of a surface of the developing roller was measured after cutting the surface layer of the developing roller and fixing the surface layer on a plate. Glossiness of 10 samples of the surface layer obtained from 10 different locations of the surface of the developing roller were measured, and an arithmetic average value of the glossiness of 10 samples was reported as a glossiness of the corresponding developing roller. The glossmeter was "Gloss meter GM-26D" (Murakami color research laboratory, Japan).

Average Protruding Bead Distance Rsm

A Rsm of the developing roller is an average value of Rsms measured at 5 points, where the points include 1/10 point, 3/10 point, 5/10 point, 7/10 point, and 9/10 point, among 10 points that evenly divides the length in an axis-direction from one end to the opposite end of the developing roller. The Rsm of the measuring point was determined by obtaining roughness profile at the measuring point, taking a portion of the roughness profile corresponding to a standard length L in a direction of an average line of the roughness profile, measuring lengths of the average line that correspond to a distance between a peak and its adjacent valley in the roughness profile of the standard length L, and calculating an arithmetic average value of the lengths. The arithmetic average value is Rsm. Conditions in which the Rsms were obtained were as follows:

Measure length L: 4.0 mm;

Standard length Lr: 0.8 mm;

Cut-off wavelength Inc: 0.8 mm;

Tip shape: a cone having a tip angle of 60°;

Tip radius: 2 μm;

Measuring rate: 0.3 mm/sec;

Measuring magnification: 10000×; and

Equipment for measuring surface roughness: "MarSurf GD 25" (Mahr, Germany)

Method of Measuring a Number Average Size of Foam Cells of Supplying Roller

A number average diameter of openings of the foam cells existing on a surface of the supply roller is an average value of values measured at 5 points, where the points include 1/10 point, 3/10 point, 5/10 point, 7/10 point, and 9/10 point, among 10 points that evenly divides the length in an axis-direction from one end to the opposite end of the supplying roller. The number average diameter of the openings of the foam cells existing on a surface of the supplying roller was measured from a scanning electron microscope image of a surface of the supplying roller. A diameter of each of the openings is an arithmetic average of the longest diameter and the shortest diameter of the opening. A number average diameter of an opening of the foam cell at each of the measuring points is an arithmetic average of individual diameters of the openings at the measuring points on in the scanning electron microscope image. A number average diameter of an opening of the foam cell on a surface of the supplying roller was determined by calculating an arithmetic average of the foam cells opening's number average diameters obtained at the five measuring points. A scanning electron microscope used in obtaining the image was "S-4800" (HITACHI, Japan).

Linear Velocity Measuring Method

A rotation linear velocity of the developing roller was determined by multiplying the number of rotation of the developing roller per hour and an external diameter of the developing roller measured at a middle point on an axis in a length direction of the developing roller. The rotation linear velocity of the photoreceptor was determined by multiplying the number of rotation of the photoreceptor per hour and an external diameter of the photoreceptor measured at a middle point on an axis in a length direction of the photoreceptor.

<Evaluation result>

The results of evaluation performed on the image forming apparatuses prepared in Examples 1 to 6 and Comparative Examples 1 to 10 are shown in Table 2.

TABLE 2

| | Glossiness of developing roller surface | Rsm of developing roller (μm) | Foam cell size of supplying roller (μm) | Rotation Velocity of developing roller (%) | Image concentration | Toner Supplying performance | Filming of developing roller | Vertical white lines after printing 100K sheets | Side contamination after printing 100K sheets |
|---|---|---|---|---|---|---|---|---|---|
| Example 1 | 7 | 320 | 420 | 120 | ⊚ | ⊚ | ⊚ | ⊚ | ⊚ |
| Example 2 | 15 | 400 | 300 | 120 | ⊚ | ⊚ | ⊚ | ⊚ | ⊚ |
| Example 3 | 15 | 400 | 500 | 120 | ⊚ | ⊚ | ⊚ | ⊚ | ⊚ |

TABLE 2-continued

| | Glossiness of developing roller surface | Rsm of developing roller (μm) | Foam cell size of supplying roller (μm) | Rotation Velocity of developing roller (%) | Image concentration | Toner Supplying performance | Filming of developing roller | Vertical white lines after printing 100K sheets | Side contamination after printing 100K sheets |
|---|---|---|---|---|---|---|---|---|---|
| Example 4 | 4 | 200 | 300 | 150 | ◎ | ◎ | ◎ | ◎ | ◎ |
| Example 5 | 5 | 220 | 480 | 150 | ◎ | ◎ | ◎ | ◎ | ◎ |
| Example 6 | 5 | 220 | 480 | 120 | ◎ | ◎ | ◎ | ◎ | ◎ |
| Comparative Example 1 | 3 | 220 | 480 | 150 | ◎ | ◎ | X | X | X |
| Comparative Example 2 | 4 | 250 | 280 | 150 | Δ | X | Δ | X | X |
| Comparative Example 3 | 16 | 420 | 500 | 150 | X | ◎ | Δ | Δ | Δ |
| Comparative Example 4 | 16 | 420 | 280 | 150 | X | X | ◎ | ◎ | ◎ |
| Comparative Example 5 | 3 | 180 | 280 | 120 | ◎ | Δ | X | X | X |
| Comparative Example 6 | 3 | 180 | 510 | 120 | Δ | Δ | X | X | X |
| Comparative Example 7 | 4 | 200 | 480 | 115 | X | X | Δ | ◎ | ◎ |
| Comparative Example 8 | 4 | 200 | 480 | 155 | ◎ | ◎ | Δ | X | X |
| Comparative Example 9 | 15 | 400 | 300 | 115 | X | X | ◎ | ◎ | ◎ |
| Comparative Example 10 | 15 | 400 | 300 | 155 | ◎ | ◎ | Δ | X | X |

◎: Very good,
○: Good,
Δ: Allowable,
X: Not allowable

As shown in Table 2, the image forming apparatuses of Examples 1 to 6, in which a glossiness of a surface of the developing roller is in a range of about 4 to about 15, a number average distance between protruding beads of the surface of the developing roller is in a range of about 200 μm to about 400 μm, a number average size of the foam cells of the supplying roller is in a range of about 300 μm to about 500 μm, and the developing roller is arranged to rotate at a rotation linear velocity of about 120% to about 150% of a rotation linear velocity of the photoreceptor, had improved performance in all aspects including image concentration, toner supplying performance, filming of the developing roller, vertical white lines, and side contamination.

However, the image forming apparatus of Comparative Example 1, in which a glossiness of a surface of the developing roller is 3, had defects in terms of vertical white lines and side contamination due to toner degradation as filming of the developing roller became severe since a developing roller resetting performance of the apparatus deteriorated.

The image forming apparatus of Comparative Example 2, in which a foam cell size of the supplying roller is 280 μm, had defects in terms of vertical white lines and side contamination due to the solid image concentration difference and the increased toner stress caused by defect occurred in a toner supplying property.

The image forming apparatus of Comparative Example 3, in which a glossiness of a surface of the developing roller is 16 and an interval between the protruding beads of the developing roller is 420 μm, had defects in terms of concentration decrease due to the toner layer problem.

The image forming apparatus of Comparative Example 4, in which a glossiness of a surface of the developing roller is 16, an interval between the protruding beads of the developing roller is 420 μm, and a foam cell size of the supplying roller is 280 μm, had defects in terms of concentration decrease and toner supply.

The image forming apparatus of Comparative Example 5, in which a glossiness of a surface of the developing roller is 3, a Rsm of the developing roller is 180 μm, and a foam cell size of the supplying roller is 280 μm, had defects in terms of side contamination and vertical white lines as the filming of the developing roller became severe, despite having no problem in image concentration and toner supplying performance.

The image forming apparatus of Comparative Example 6, in which a glossiness of a surface of the developing roller is 3, a Rsm of the developing roller is 180 μm, and a foam cell size of the supplying roller is 510 μm, had image concentration and toner supplying performance at allowable levels, but side contamination occurred due to severe filming of the developing roller, and vertical white lines were generated due to stress applied to the toner.

The image forming apparatus of Comparative Example 7, in which a glossiness of a surface of the developing roller is 4, a Rsm of the developing roller is 200 μm, a foam cell size of the supplying roller is 480 μm, and a velocity of the developing roller is 115%, had a good improvement in filming of the developing roller, but an image concentration defect occurred due to a low velocity of the developing roller.

The image forming apparatus of Comparative Example 8, in which a glossiness of a surface of the developing roller is 4, a Rsm of the developing roller is 200 μm, a foam cell size of the supplying roller is 480 μm, and a velocity of the developing roller is 155%, had no problem in terms of image concentration and toner supplying performance, but vertical white lines and side contamination occurred due to stress applied on the toner since a velocity of the developing roller was high.

The image forming apparatus of Comparative Example 9, in which a glossiness of a surface of the developing roller is 15, a Rsm of the developing roller is 400 μm, a foam cell size of the supplying roller is 300 μm, and a velocity of the developing roller is 115%, had a good improvement in filming of the developing roller, but an image concentration defect occurred due to a low velocity of the developing roller.

The image forming apparatus of Comparative Example 10, in which a glossiness of a surface of the developing roller is 15, a Rsm of the developing roller is 400 μm, a foam cell size of the supplying roller is 300 μm, and a velocity of the developing roller is 155%, had no problem in terms of image concentration and toner supplying performance, but vertical white lines and side contamination occurred due to stress applied on the toner since a velocity of the developing roller was high.

As described above, an image forming apparatus according to one or more exemplary embodiments may have a significantly improved developing roller resetting performance. In this regard, a filming phenomenon of a developing roller may be prevented for a long period of time. Accordingly, a stress applied on a toner may reduce, and thus deterioration of the toner may be prevented for a long period of time. Also, a thickness of a toner layer which is developed on an electrostatic latent image, may be appropriately maintained for a long period of time. Particularly, the image forming apparatus may be effectively applied to an electrophotographic image forming apparatus that uses a polymerized toner, or, more particularly, to an electrophotographic image forming apparatus that uses a dry toner (e.g., a styrene-acrylate-based toner or a polyester-based toner) having a sphericity in a range of about 0.960 to about 1.0.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrophotographic image forming apparatus comprising:
- a main body;
- a photoreceptor configured to form an electrostatic latent image; and
- a developing roller that develops the electrostatic latent image by supplying a toner to the electrostatic latent image;
- wherein:
  - a surface layer of the developing roller includes a plurality of protruding beads and has a surface roughness based on:
    - a thickness of the surface layer,
    - a particle size of the plurality of protruding beads, and
    - an amount of the plurality of protruding beads,
- such that the surface layer has the surface roughness corresponding to a glossiness of the surface layer of the developing roller in a range of 4 to 15, in which a number average distance between the protruding beads is in a range of 200 μm to 400 μm,
  - where the glossiness is measured as a relative ratio with respect to 100 which is a glossiness of a surface of glass having a refractive index of 1.567, with the incident angle of incident light at 60 degrees.

2. The electrophotographic image forming apparatus of claim 1, further comprising:
- a toner reserving unit; and
- a supplying roller that supplies the toner from the toner reserving unit to the developing roller,
- wherein the photoreceptor, the developing roller, and the supplying roller are provided in the form of an imaging cartridge.

3. The electrophotographic image forming apparatus of claim 2, wherein the supplying roller comprises a resin foam; and a conductive agent contained in the resin foam.

4. The electrophotographic image forming apparatus of claim 3, wherein the resin foam is polyurethane foam, ethylene-propylene-diene rubber foam, or silicon rubber foam.

5. The electrophotographic image forming apparatus of claim 1, wherein the developing roller further comprises a shaft; an electroconductive elastic layer provided on an outer circumference of the shaft
- wherein the surface layer covers the electroconductive elastic layer.

6. The electrophotographic image forming apparatus of claim 5, wherein the electroconductive elastic layer comprises an elastomer matrix; and electroconductive particles dispersed in the elastomer matrix.

7. The electrophotographic image forming apparatus of claim 6, wherein the elastomer matrix is silicon rubber, polyurethane, or ethylene-propylene-diene rubber.

8. The electrophotographic image forming apparatus of claim 5, wherein the surface layer comprises beads that are selected from an acryl-based resin such as polyacrylate or polymethacrylate; a polyamide-based resin such as nylon; a polyolefin-based resin such as polyethylene or polypropylene; a silicon-based resin, a phenol-based resin; a polyurethane-based resin; a styrene-based resin; a benzoguanamine resin; a polyfluoride vinylidene-based resin; a metal oxide powder such as silica, alumina, titanium oxide, or an iron oxide; a boron nitride; a silicon carbide; or a combination thereof.

9. The electrophotographic image forming apparatus of claim 1, wherein the toner is a dry toner having a sphericity in a range of 0.960 to 1.0.

10. The electrophotographic image forming apparatus of claim 1, wherein a thickness of the surface layer is in a range of 1 μm to 100 μm.

11. The electrophotographic image forming apparatus of claim 1, wherein a resistance of the surface layer is in a range of $10^5$ Ω cm to $10^{11}$ Ω cm.

12. The electrophotographic image forming apparatus of claim 1, wherein a shape of the beads is a sphere.

13. The electrophotographic image forming apparatus of claim 1, wherein a shape of the beads is a plate.

14. The electrophotographic image forming apparatus of claim 1, further comprising a supplying roller that supplies the toner from the toner reserving unit to the developing roller,
- wherein the supplying roller comprises a plurality of foam cells, and a number average size of the foam cells is in a range of 300 μm to 500 μm.

15. The electrophotographic image forming apparatus of claim 1, wherein the developing roller is arranged to rotate at a rotation linear velocity of 120% to 150% of a rotation linear velocity of the photoreceptor.

16. An imaging cartridge attachable and detachable to a main body of an electrophotographic image forming apparatus comprising a toner reserving unit, wherein the imaging cartridge comprises:

a photoreceptor configured to form an electrostatic latent image; and a developing roller that develops the electrostatic latent image by supplying a toner to the electrostatic latent image; wherein:

a surface layer of the developing roller includes a plurality of protruding beads and has a surface roughness based on:

a thickness of the surface layer, a particle size of the plurality of protruding beads, and an amount of the plurality of protruding beads, such that the surface layer has the surface roughness corresponding to a glossiness of a surface layer of the developing roller in a range of 4 to 15, in which a number average distance between the protruding beads is in a range of 200 μm to 400 μm, where the glossiness is measured as a relative ratio with respect to 100 which is a glossiness of a surface of glass having a refractive index of 1.567, with the incident angle of incident light at 60 degrees.

17. The imaging cartridge of claim 16, further comprising a supplying roller that supplies the toner from the toner reserving unit to the developing roller, wherein the supplying roller comprises a plurality of foam cells, and a number average size of the foam cells is in a range of 300 μm to 500 μm.

18. The imaging cartridge of claim 16, wherein the developing roller is arranged to rotate at a rotation linear velocity of 120% to 150% of a rotation linear velocity of the photoreceptor.

* * * * *